(12) United States Patent
Tanaka et al.

(10) Patent No.: US 6,648,503 B2
(45) Date of Patent: Nov. 18, 2003

(54) CALORIMETER AND MANUFACTURING METHOD THEREOF

(75) Inventors: Keiichi Tanaka, Chiba (JP); Toshimitsu Morooka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/760,030

(22) Filed: Jan. 12, 2001

(65) Prior Publication Data

US 2002/0003830 A1 Jan. 10, 2002

(30) Foreign Application Priority Data

Jan. 14, 2000 (JP) ........................................ 2000-006509
Dec. 25, 2000 (JP) ........................................ 2000-393134

(51) Int. Cl.[7] .................... G01K 17/02; G01N 7/02; G01N 25/00; G01J 5/20
(52) U.S. Cl. ...................... 374/31; 374/10; 250/338.1; 422/51
(58) Field of Search ................. 374/31, 41, 42, 374/121, 10, 32; 422/51; 250/338.1, 338.4, 332; 29/592

(56) References Cited

U.S. PATENT DOCUMENTS

| | | | | |
|---|---|---|---|---|
| 4,575,631 A | * | 3/1986 | Satchell | 250/332 |
| 5,100,479 A | * | 3/1992 | Wise et al. | 136/225 |
| 5,120,505 A | * | 6/1992 | Lowell, Jr. et al. | 422/58 |
| 5,162,658 A | * | 11/1992 | Turner et al. | 250/554 |
| 5,298,748 A | * | 3/1994 | Kenny et al. | 250/338.1 |

(List continued on next page.)

FOREIGN PATENT DOCUMENTS

EP 000534768 A * 3/1993 ................ 374/121

OTHER PUBLICATIONS

Mechin L et al; "Microbolometres SupraconductteursSuspendus Operant A La Temperaturede L' Azote Liquide; Conception Et Fabrication Par Micro–Usinage De Substrats De Silicium" Le Vide: Science, Technique Et Applications, FR, SFV, vol. 53, No. 283, 1997, pp. 124–139, XP000681492 ISSN: 1266–0167.

Mechin L et al; "Sensitive Ir Bolometers Using Superconducting Ybacuo Air Bridges Onmicromachined Silicon Substrates" Sensors and Actuators A, CH, Elsevier Sequoia S. A., Lausanne, vol. A55, No. 1, Jul. 15, 1996, pp. 19–23, XP000641562 ISSN: 0924–4247.

(List continued on next page.)

*Primary Examiner*—Diego Gutierrez
*Assistant Examiner*—Gail Verbitsky
(74) *Attorney, Agent, or Firm*—Adams & Wilks

(57) ABSTRACT

A colorimeter has an absorber for absorbing radiation energy and converting the radiation energy into thermal energy. A resistor is connected to the absorber for converting thermal energy into an electrical signal. A membrane is connected to the resistor for controlling a thermal discharge from the resistor. A substrate is connected to the membrane and has a tri-layer structure comprised of an etching layer having a preselected thickness, an etching stop layer and a support substrate. The membrane is spaced-apart from a main surface of the etching stop layer by the preselected thickness of the etching layer.

9 Claims, 11 Drawing Sheets

U.S. PATENT DOCUMENTS

| | | | | |
|---|---|---|---|---|
| 5,369,280 A | * | 11/1994 | Liddiard | 250/370.08 |
| 5,589,689 A | * | 12/1996 | Koskinen | 250/339.01 |
| 5,602,393 A | * | 2/1997 | Gerard | 250/338.4 |
| 5,647,946 A | * | 7/1997 | Belcher et al. | 156/345 |
| 5,760,398 A | * | 6/1998 | Blackwell et al. | 250/332 |
| RE35,872 E | * | 8/1998 | Fenner et al. | 250/336.2 |
| 5,801,070 A | * | 9/1998 | Zanini-Fisher et al. | 438/54 |
| 5,804,462 A | * | 9/1998 | Liu et al. | 438/53 |
| 5,813,764 A | * | 9/1998 | Visser et al. | 374/12 |
| 5,965,886 A | * | 10/1999 | Sauer et al. | 250/332 |
| 6,034,374 A | * | 3/2000 | Kimura et al. | 250/370.08 |
| 6,079,873 A | * | 6/2000 | Cavicchi et al. | 374/10 |
| 6,194,722 B1 | * | 2/2001 | Fiorini et al. | 250/338.1 |
| 6,198,098 B1 | * | 3/2001 | Laou | 250/338.1 |
| 6,239,431 B1 | * | 5/2001 | Hilton et al. | 250/336.2 |
| 6,300,632 B1 | * | 10/2001 | Liu et al. | 250/338.4 |
| 6,305,840 B1 | * | 10/2001 | Kim et al. | 374/133 |
| 6,339,220 B1 | * | 1/2002 | Oda | 250/338.1 |
| 2002/0040967 A1 | * | 4/2002 | Oda | 250/228.1 |

OTHER PUBLICATIONS

M Kimura and K Komatsuzaki: "Microheater Made of Heavily Boron Doped Single Crystal Silicon Beam" Technical Digest of the Sensor Symposium, XX, XX, 1992, pp. 169–172, XP002159427.

Chou B C S et al: "Micromachining on (111)–oriented silicon" Sensors and Actuators A, CH, Elsevier Sequoia S.A., Lausanne, vol. 75, No. 3, Jun. 8, 1999, pp. 271–277, XP004175049 ISSN: 0924–4247.

* cited by examiner

CALORIMETER AND MANUFACTURING METHOD THEREOF

BACKGROUND OF THE INVENTION

The present invention relates to a superconducting radiation detector, and to a method of manufacturing a calorimeter having a membrane for controlling thermal conductivity and arranged a specified distance from a substrate.

Currently, development of calorimeters using a superconducting transition edge is being carried out in various research laboratories. As a reference publication, there is, for example, Applied Physics Letters 66,1988(1995). In this publication, a calorimeter comprises an absorber for absorbing radiation and converting energy of the radiation into thermal energy, a resistor attached to the absorber for converting the thermal energy into an electrical signal, and a membrane for externally discharging heat. The calorimeter maintains a steady state by balancing joule heat generated by electrical current flowing in the resistor and heat discharged to the outside through the membrane. The membrane applies micromachining technology, and uses a thin insulator under 1 $\mu$m. A silicon nitride film is used as the insulator.

A conventional membrane production method uses a silicon substrate on which at least a silicon nitride film is deposited on the one side of silicon substrate, and after manufacturing an absorber and a resistor on the surface of the formed silicon nitride film, the silicon is etched from the back surface (reference publication IEEE Trans. Appl. Super. 5,2690(1995)). With the conventional manufacturing method, it is necessary to perform double surface patterning, because the silicon is etched from the back surface. As a result, since both surfaces of a wafer are grounded to an exposure device holder, there is a danger of elements being contaminated. Further, if the silicon is etched from a back surface, in order to completely etch the thick parts of the wafer it has been considered to degrade mechanical strength. In particular, when a calorimeter is arrayed, there is a need to etch from the back surface only for the array number, and it has been considered to further improve the mechanical strength of the whole substrate. A manufacturing method for a membrane using a conventional sacrificial layer is also shown. A sacrificial layer is formed on the substrate, an insulating film is formed on the sacrificial layer and the sacrificial layer is etched to form a membrane. However, if this method is used, a stepped region is inevitably formed on part of the membrane, and it is difficult to maintain mechanical strength of a substrate rather than a substrate before etching as it is easy for cracks and the like to occur.

SUMMARY OF THE INVENTION

In order to solve these type of problems, there is provided a calorimeter having an absorber for converting energy of radioactive rays into thermal energy, and a resistor for converting thermal energy into an electrical signal using superconducting transition and arranged on a membrane for controlling thermal discharge from the resistor. The membrane is attached to a substrate having a tri-layer structure of an etching layer, an etching stop layer and a support substrate, with the membrane being arranged separated by the thickness of the etching layer apart from the etching stop layer.

As a result, the support substrate exists at a lower portion maintaining a specified distance from the membrane. If the thickness of the etching layer is, for example, 30 $\mu$m, and the support substrate is, for example, 500 $\mu$m, the mechanical strength of the substrate after etching the etching layer is sufficiently strong because the support substrate is sufficiently thick compared to the etching layer. If the membrane is bridged, it is possible to obtain a membrane having a degree of thermal conductivity according to design parameters by varying the length and thickness. By using a substrate having a tri-layer structure of an etching layer, an etching stop layer and a support substrate, and forming elements on a membrane formed as a film on the etching layer side, elements and membrane patterning are on the same surface, and there is no danger of contaminating the pattern surface.

There is also provided a manufacturing method for a calorimeter having an absorber for converting energy of radioactive rays into thermal energy, and a resistor for converting thermal energy into an electrical signal using a superconducting transition and arranged on a membrane for controlling thermal discharge from the resistor. The membrane is attached to a substrate having a tri-layer structure of an etching layer, an etching stop layer and a support substrate. According to the present invention, the is arranged in a specified direction and the etching layer is etched from the etching layer side.

As a result, it is possible to more easily perform wet etching of the etching layer underneath the membrane, and it is possible to have the membrane separated by the thickness of the etching layer apart from the support substrate. In particular, by forming the etching layer from planar (100) oriented silicon, and arranging the orientation of the membrane to <100>, it is made possible to etch the etching layer in a short time.

There is also provided a manufacturing method for a calorimeter having an absorber for converting energy of radioactive rays into thermal energy, and a resistor for converting thermal energy into an electrical signal using a superconducting transition and arranged on a membrane for controlling thermal discharge from the resistor. The membrane is attached to a substrate having a tri-layer structure of an etching layer, an etching stop layer and a support substrate. According to the present invention, a hollow is provided at part of the etching layer, a sacrificial layer is provided, a surface of the etching layer is flattened, and the etching layer is etched from the etching layer side.

Since the back surface of the etching layer is flattened, no stepped portion is caused in the membrane formed after etching of an amorphous material constituting the sacrificial layer. Therefore, there is no effect of cracks or the like occurring in a stepped portion of the membrane, which means that the mechanical strength of the membrane is improved. Also, since the amorphous layer does not have crystallinity, the etching rate is also fast. As a result, it is possible to reduce the time taken to manufacture a calorimeter. Also, since the amorphous layer does not have crystallinity, it is possible to freely choose the shape of the membrane, and it is easy to adjust the thermal conductivity.

DETAILED DESCRIPTION OF THE PREFERRED EMBODIMENTS

An embodiment of a calorimeter having a superconducting device of the present invention, and a manufacturing method thereof, will be described in detail in the following, based on the drawings. It should be understood that the present invention is not limited to this embodiment.

Embodiment 1

FIG. 1 is a schematic diagram of a calorimeter having an absorber for converting energy of radioactive rays into thermal energy, and a resistor for converting thermal energy into an electrical signal using superconducting transition and arranged on a membrane for controlling thermal discharge from the resistor. The membrane is attached to a substrate having a tri-layer structure of an etching layer, an etching stop layer and a support substrate. The membrane is arranged separated by the thickness of the etching layer apart from the etching stop layer.

Figure 1A:
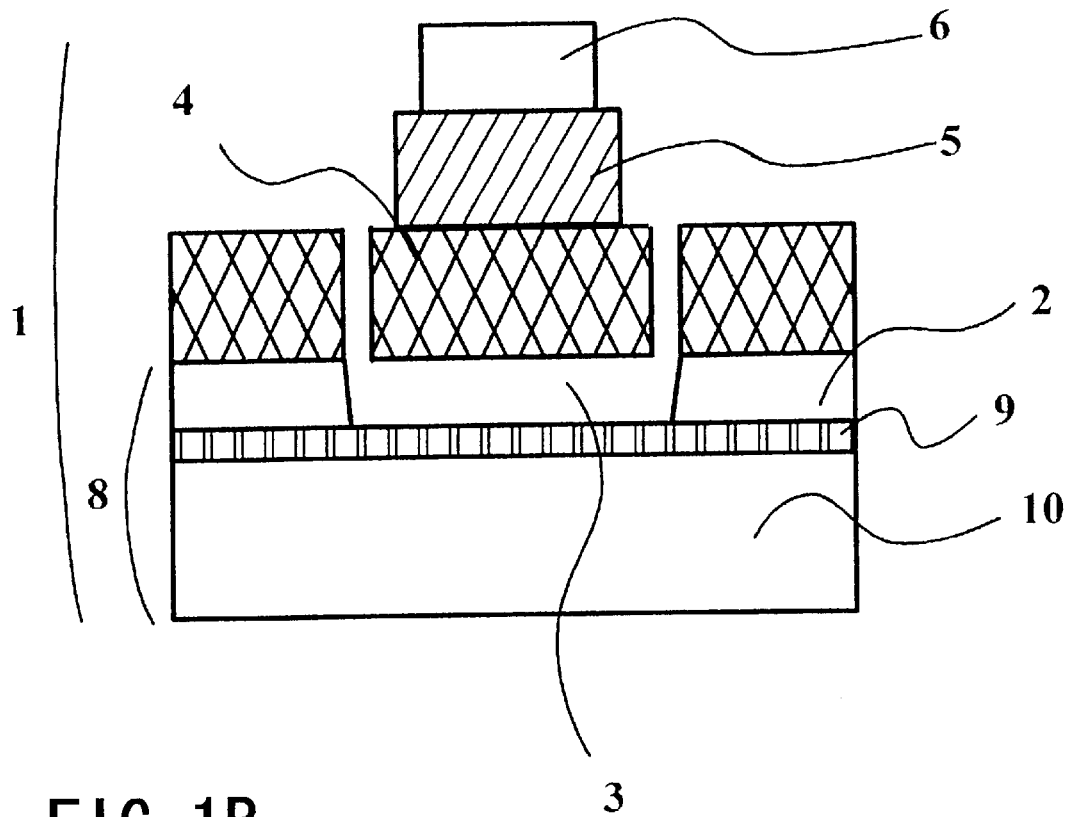
FIG. 1 is a schematic drawing showing a calorimeter relating to embodiment 1 of the present invention.
Figure 1B:
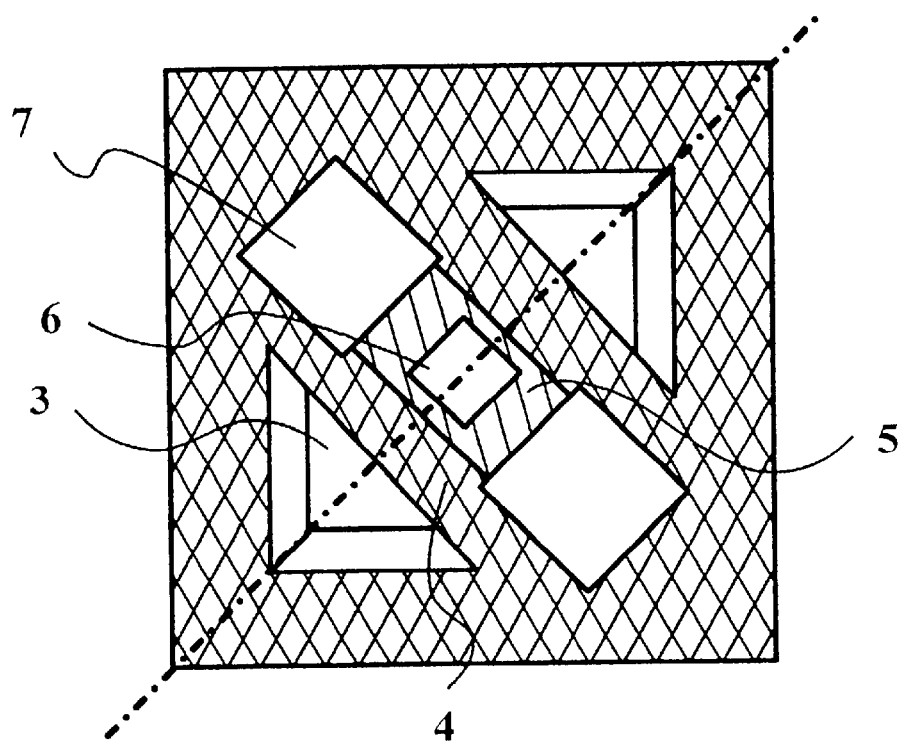

FIG. 1B is a schematic drawing looking at an element from an absorber 6. FIG. 1A is a cross section taken along the dotted line in FIG. 1B.

A calorimeter 1 has a resistor 5, an absorber 6 and superconducting wiring 7 laminated on a membrane 4 which traverses a hole 3 that is fabricated by etching of a part of etching layer 2.

A substrate 8 has a tri-layer structure comprising an etching layer 2, and etching stop layer 9 and a support substrate 10. A Silicon On Insulator (SOT) wafer can be used as the substrate 8. An SOT substrate has a tri-layer structure comprising a thin silicon layer, an oxidation film and a thick silicon substrate. It is possible to use the thin silicon layer as the etching layer 2, the oxidation film as the etching stop layer 9, and the thick silicon substrate as the support substrate 10. It is preferable to make the etching layer 2 sufficiently thick so that the membrane 4 and the etching stop layer 9 are sufficiently spaced apart, but in order to prevent the time required to etch the etching layer 2 being too long, the thickness is preferably a few tens of $\mu$m. It is sufficient for the etching stop layer 9 to have a thickness of 0.1 $\mu$m, provided the selection ratio for etching of the etching layer 2 if sufficiently large. The support substrate 10 is preferably at least a few hundred microns, in order to increase the mechanical strength of the microcalorimeter 1. It is possible to select, for example, silicon nitride film as the material of the membrane 4. The membrane 4 is arranged separated by the thickness of the etching layer 2 apart from the etching stop layer 9. As a result, a support substrate exists at a lower portion maintaining a specified distance from the membrane. If the thickness of the etching layer is, for example, 30 $\mu$m, and the support substrate is, for example, 500 $\mu$m, the mechanical strength of the substrate after etching the etching layer is sufficiently strong because the support substrate is sufficiently thick compared to the etching layer.

A fixed voltage is continuously applied to the resistor 5 arranged on the membrane 4, and a fixed joule heat is generated in the resistor 5. The joule heat is diffused to the support substrate 10 through the membrane 4. There is a heat balance state between the joule heat and heat diffused to the support substrate 10 through the membrane 4, and by causing variation in the shape and thickness of the membrane 4 it is possible to control the ease with which heat is released. If the membrane 4 is bridged, for example, it is possible to obtain a membrane 4 having a designed value of thermal conductivity by varying the length and thickness. The shape of the membrane is not limited to a bridge, and can also be meshed or the like.

By using a substrate having a tri-layer structure of an etching layer, an etching stop layer and a support substrate, and forming elements on a membrane formed as a film on the etching layer side, elements and membrane patterning are on the same surface, and there is no danger of contaminating the pattern surface.

In the above described manner, by making a calorimeter having an absorber for converting energy of radioactive rays into thermal energy, and a resistor for converting thermal energy into an electrical signal using superconducting transition and arranged on a membrane for determining thermal conductivity, the membrane being attached to a substrate having a tri-layer structure of an etching layer, an etching stop layer and a support substrate, and with the membrane being arranged separated by the thickness of the etching layer apart from the etching stop layer, it is possible to obtain a calorimeter that has elements of a large mechanical strength compared to using the silicon substrate of the related art, and which is suitable for making into an array.

Embodiment 2

FIG. 2–FIG. 5 are schematic drawings of manufacturing method for a calorimeter having an absorber for converting energy of radioactive rays into thermal energy, and a resistor for converting thermal energy into an electrical signal using superconducting transition and arranged on a membrane for controlling thermal discharge from the resistor, the membrane being attached to a substrate having a tri-layer structure of an etching layer, an etching stop layer and a support substrate, including the steps of arranging the membrane in a specified direction and etching the etching layer from the etching layer side.

Figure 2A:
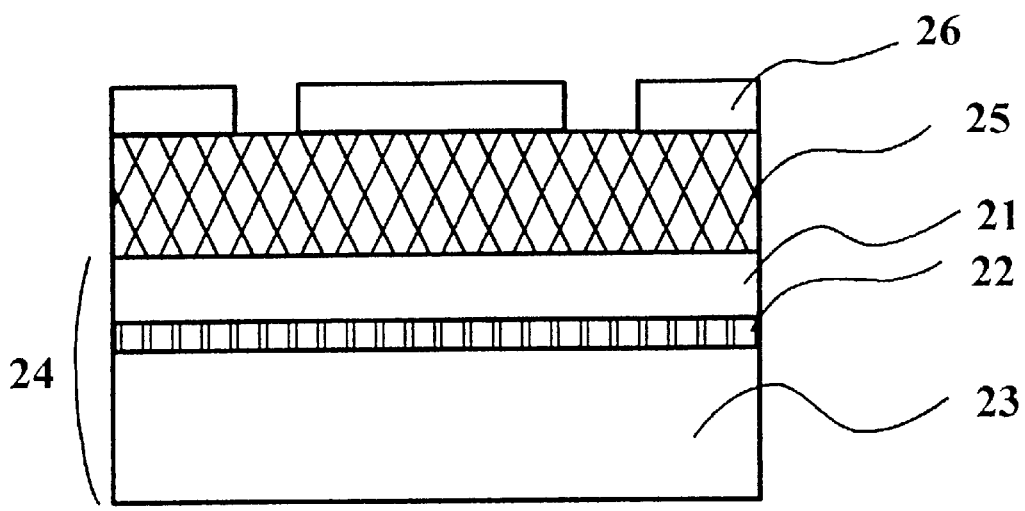
FIG. 2 is a schematic drawing showing a calorimeter relating to embodiment 2 of the present invention, and a manufacturing method thereof.

FIG. 2A is a schematic drawing showing formation of an insulating film 25 on a substrate 24 having a tri-layer structure comprising an etching layer 21, and etching stop layer 22 and a support substrate 23, and forming an etching mask 26 on the insulating film 25.

Figure 2B:
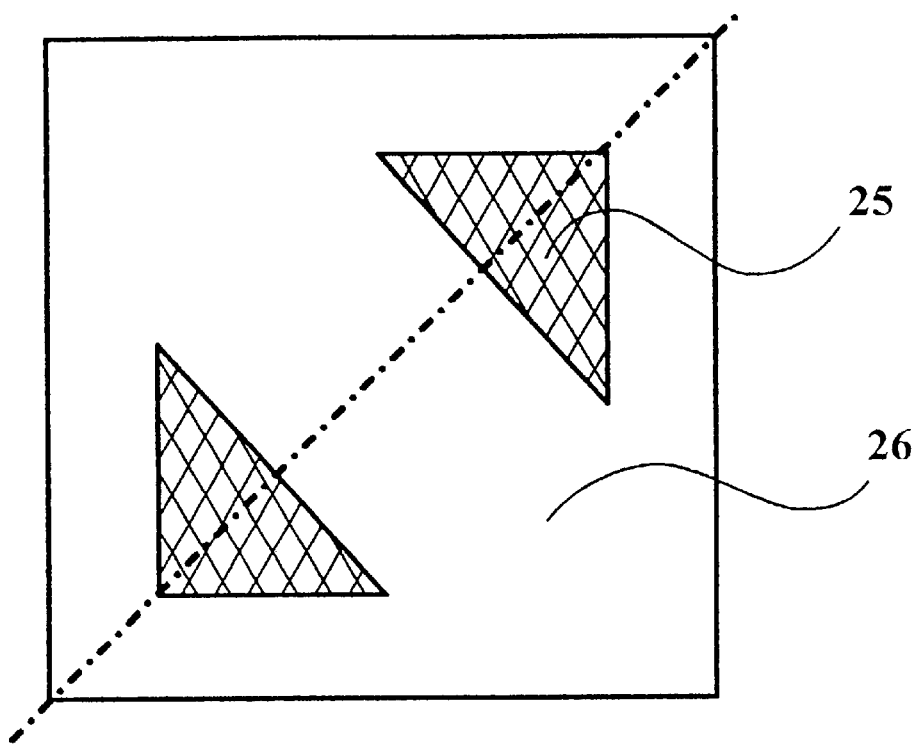

It is possible to use an SOT (Silicon On Insulator) substrate as the substrate 24. An SOI substrate has a tri-layer structure comprising a thin silicon layer, an oxidation film and a thick silicon substrate. It is possible to use the thin silicon layer as the etching layer 21, the oxidation film as the etching stop layer 22, and the thick silicon substrate as the support substrate 23. FIG. 2B is a schematic drawing looking from the side of the insulating film 25 in FIG. 2A. The planar orientation of the SOT substrate is preferably a (100) plane. The insulating film 25 formed on the SOI substrate can use, for example, a silicon nitride film. The insulating film 25 is also formed on the etching layer 21 side of the SOI substrate. As film formation means, it is possible to use, for example, LPCVD (Low Pressure Chemical Vapor Deposition), Plasma-CVD or sputtering. However, it is preferable to make the film stress as low as possible. The thickness of the insulating film 25 is dependent on the thermal conductance design parameters, however is preferably from 1 $\mu$m–2 $\mu$m. Next, the design method for the etching mask 26 will be described. It is necessary for the material used for the etching mask 26 to be selected as a material that has adequate rate of selectivity with respect to etching of the insulating film 25. If the insulating film 25 is a silicon nitride film, it is possible to remove by dry etching, such as RIE (Reactive Ion Etching). In this case, it is possible to use, for example, aluminum or resist as the material of the etching mask 26. The shape of the etching mask 26 can be selected in a triangular pattern, such as is shown, for example, in FIG. 2B. However, the shape of the etching mask 26 is not limited to that shown in FIG. 2B.

Figure 3A:
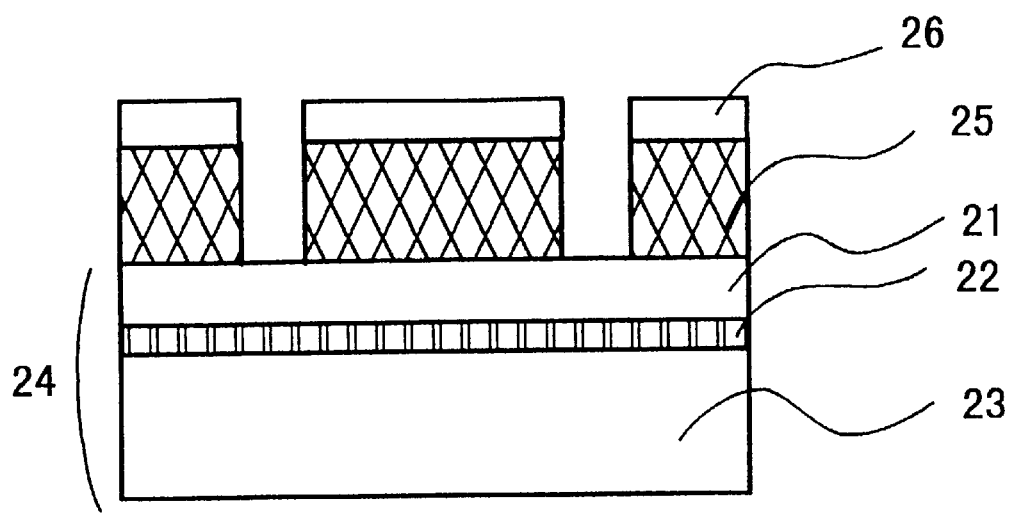
FIG. 3 is a schematic drawing showing a calorimeter relating to embodiment 2 of the present invention, and a manufacturing method thereof.
Figure 3B:
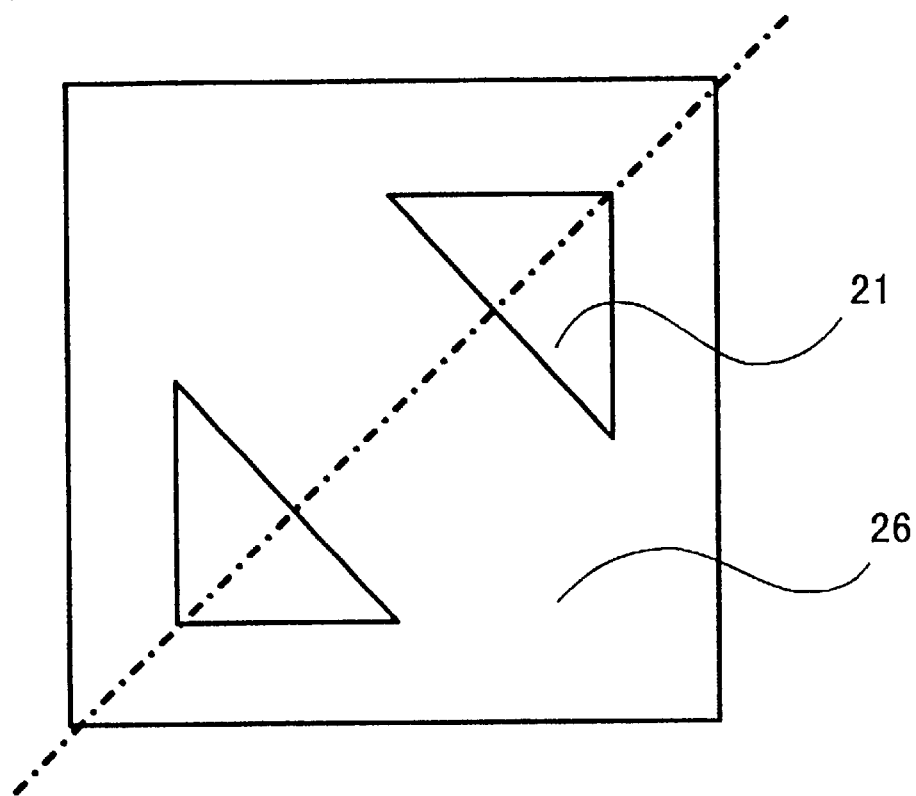

Next, a process for etching the insulating film 25 is shown in FIG. 3. FIG. 3A is a schematic diagram of etching of the insulating film 25 in FIG. 2A, and FIG. 3B is a schematic diagram looking from the direction of the insulating film 25. If the insulating film 25 is a silicon nitride film, it is possible to etch using RIE. It is possible to use, for example, a mixed gas of SF6 and O2 as an etching gas. If, for example, RIE power is a few tens of W, gas flow amount is less than 100 sccm, a ratio of SF6 and O2 flow amount is 5:1, and pressure is a few Pa, it is possible to obtain a selection ratio for the SOI substrate, and it is possible to etch the insulating film 25.

Figure 4A:
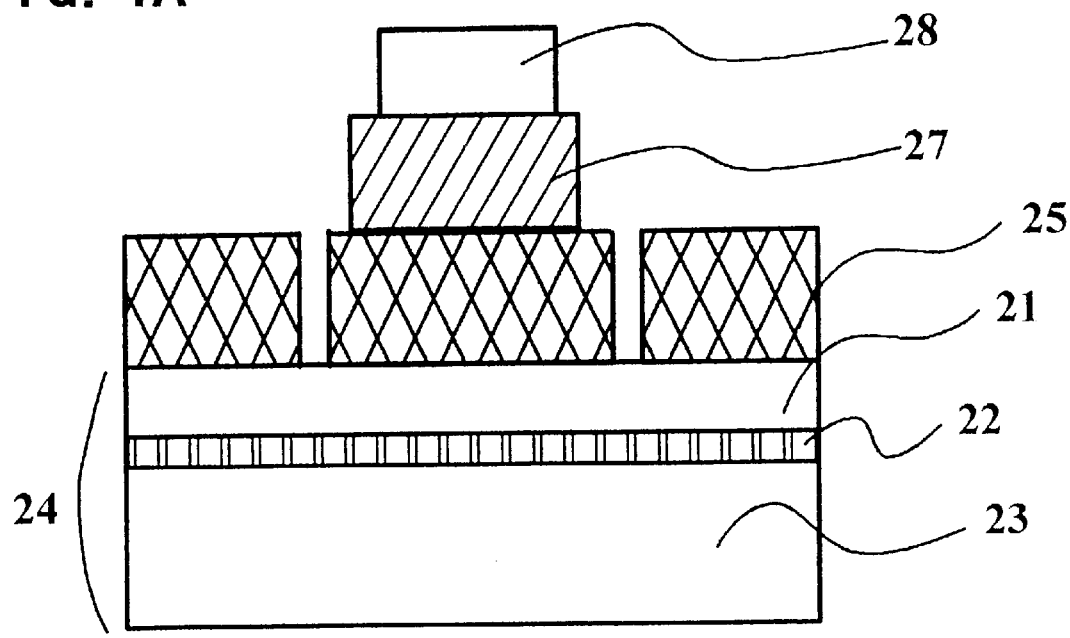
FIG. 4 is a schematic drawing showing a calorimeter relating to embodiment 2 of the present invention, and a manufacturing method thereof.
Figure 4B:
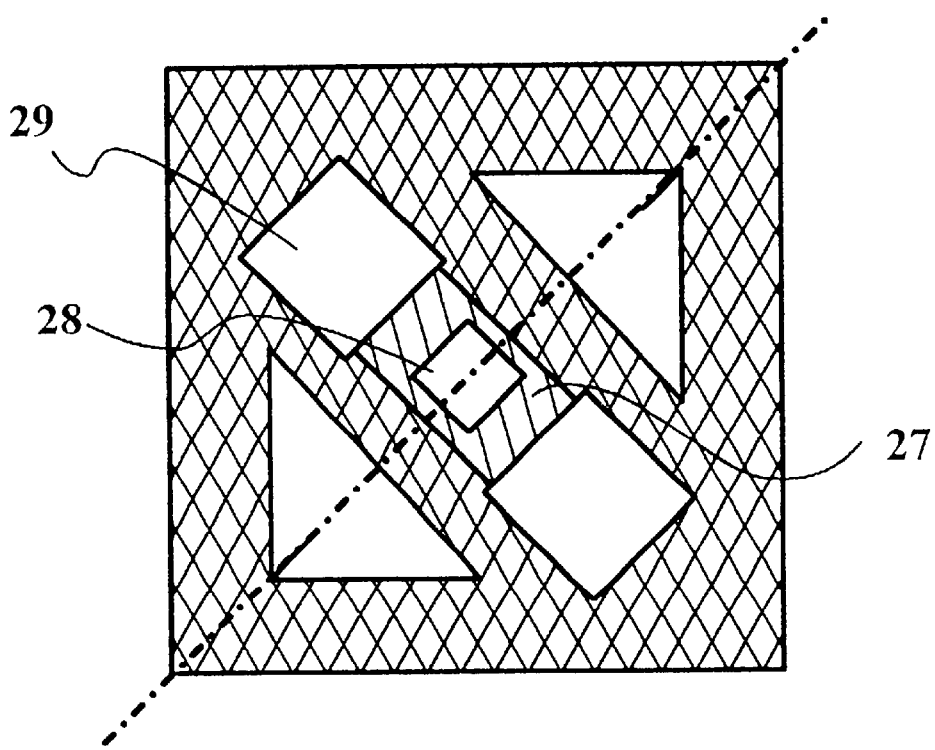

FIG. 4A is a schematic drawing showing a process of stripping the etching mask after the processing of FIG. 3A, and forming a resistor 27 and absorber 28 on the insulating film 25 formed as a bridge shape. FIG. 4B is a schematic drawing looking from the direction of the insulating film 25 in FIG. 4A. FIG. 4A is a cross section along the dotted line in FIG. 4B. A calorimeter comprises an absorber 28 for converting an externally input signal to thermal energy, and a resistor 27 whose resistance value varies with Joule heat around the transition temperature, and which converts an externally input signal to an electrical signal. The externally input signals are, for example, radioactive rays or the material with kinetic energy. It is possible to use a bilayer superconductor or a single layer superconductor as the resistor. In the case of a bilayer structure, it is possible to design the superconducting transition temperature by varying the ratio of film thicknesses of the normal conductor layer and the superconductor layer. It is also possible for a single layer superconductor to have the functions of both the absorber 28 and the resistor 27.

If the resistor 27 and the absorber 28 are selected as, for example, titanium and gold, they can be made in the following manner. In FIG. 3A, after patterning of a silicon nitride film, being the insulating film 25, has been completed, aluminum, being the etching mask 26, is removed. It is possible for the aluminum to be etched using an alkali solution. Next, titanium, being the resistor 27, is film formed on the insulating film 25 side. The film formation method is sputtering or vacuum evaporation. After formation of the titanium film, a film of gold is formed without breaking the vacuum. Next, patterning of the gold and titanium is performed using mask exposure. It is possible for the gold to be etched using KI (potassium iodide)+I, and to etch the titanium using a hydrogen fluoride solution. After that, wiring 29 is formed as an electrode. It is possible, for example, to use niobium as the superconducting wiring 29, and for patterning to use a lift-off method.

Figure 5A:
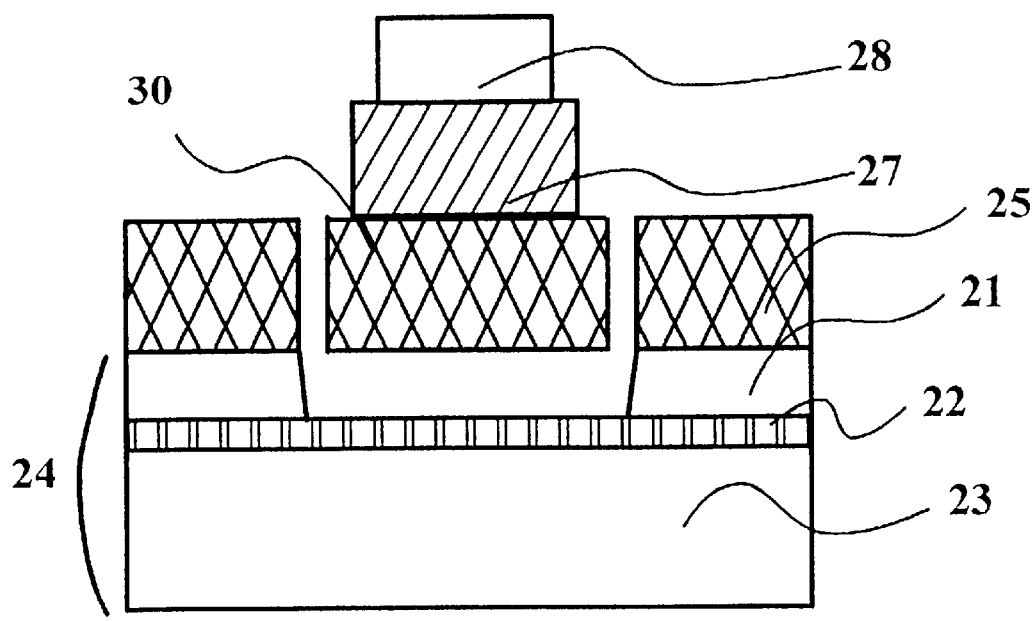
FIG. 5 is a schematic drawing showing a calorimeter relating to embodiment 2 of the present invention, and a manufacturing method thereof.
Figure 5B:
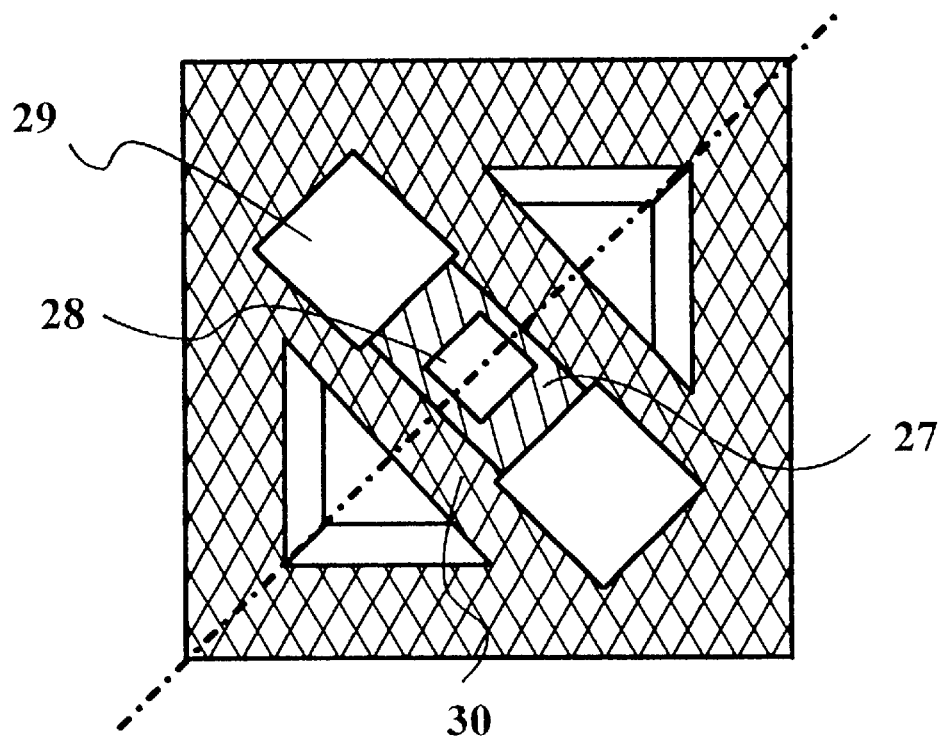

FIG. 5A is a cross sectional drawing of an element constituting a membrane 30, where an SOI substrate is etched using anisotropic etching. FIG. 5B is a schematic drawing looking at the element from the direction of the insulating film 25. FIG. 5A is a cross section taken along the dotted line in FIG. 5B.

A fluid for etching the 501 substrate can be, for example, an aqueous solution of hydrazine, an aqueous solution of KOH (potassium hydroxide), or tetraalkylammonium hydroxide (TMAH). The temperature of the liquid is set to 50–100 degrees. If the planar oriented (100) SOI substrate is etched, a silicon surface having a planar orientation (111) having a slower etching rate than the planer orientation (100) appears on an edge along with a horizontal or vertical direction, with respect to an orientation. A surface exponent appearing at an edge that is not horizontal or vertical to the orientation becomes other than the (111) plane. (221) and (311) are made to appear by selecting the direction of membrane to <100>. These surfaces have a fast etching rate compared to (111), which means that silicon below the membrane 30 is etched faster than in the <100> orientation. Etching in the depth direction is prevented by the etching stop layer 22 being formed on the Si substrate. As described above, differing from the related art, it is possible to manufacture the membrane 30 using patterning and etching from a single surface. Thermal conductivity of the membrane can be controlled by the shape and thickness of the insulating film. Therefore, the thermal conductivity can be freely designed. Also, it is possible to make the shape of the membrane 30 any shape such as a rhomboid or a trapezoid etc. by varying the pattern of the etching mask 26 of FIG. 5A.

As described above, an absorber, for converting energy of radioactive rays into thermal energy, and a resistor, for converting thermal energy into an electrical signal using superconducting transition are arranged on a membrane for determining thermal conductivity, the membrane is attached to a substrate, the substrate has a tri-layer structure of an etching layer, an etching stop layer and a support substrate, and by using a step of arranging the membrane in a specified direction and wet etching the etching layer underneath the membrane it is possible to easily perform etching, and it is possible to arrange the membrane separated by the thickness of the etching layer. In particular, by forming the etching layer from planar (100) oriented silicon, and arranging the orientation of the membrane to <100>, it is made possible to etch the etching layer in a short time. By using a substrate having a tri-layer structure, patterning is only performed on one surface, and there is no danger of the pattern surface being contaminated. Also, since only the etching layer of the tri-layer structure substrate is etched, the mechanical strength is improved, and it becomes easier to handle.

Embodiment 3

FIG. 6–FIG. 11 are schematic diagrams of a manufacturing method for a calorimeter, having an absorber for converting energy of radioactive rays into thermal energy, and signal using superconducting transition and arranged on a a resistor for converting thermal energy into an electrical membrane for determining thermal conductivity, the membrane being attached to a substrate having a tri-layer structure of an etching layer, an etching stop layer and a support substrate, comprising the steps of providing a hollow at part of the etching layer, depositing a sacrificial layer, flattening a surface of the etching layer, and etching the etching layer from the etching layer side.

Figure 6A:
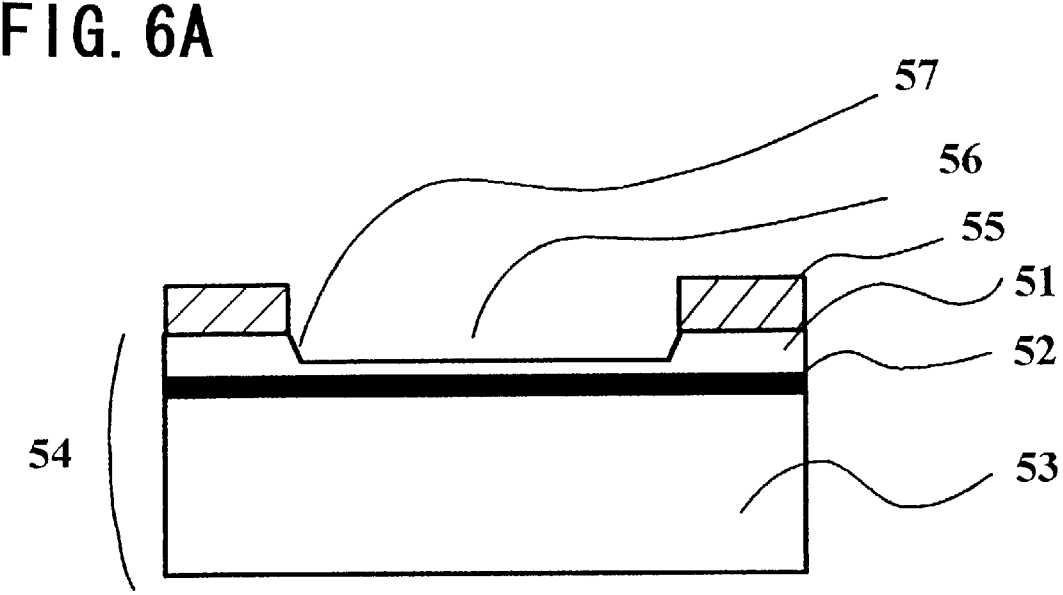
FIG. 6 is a schematic drawing showing a calorimeter relating to embodiment 3 of the present invention, and a manufacturing method thereof.

FIG. 6A is a schematic diagram of a process of forming an etching mask 55 on a substrate 54 having a tri-layer structure comprising an etching layer 51, an etching stop layer 52 and a support substrate 53, and providing a hollow portion 56 (hereinafter referred to as a "hollow") at part of the etching layer 51. It is possible to use an SOI (Silicon On Insulator) substrate as the substrate 54. An SOI substrate has a tri-layer structure comprising a thin silicon layer, an oxidation film and a thick silicon substrate. It is possible to use the thin silicon layer as the etching layer 51, the oxidation film as the etching stop layer 52, and the thick silicon substrate as the support substrate 53.

Figure 6B:
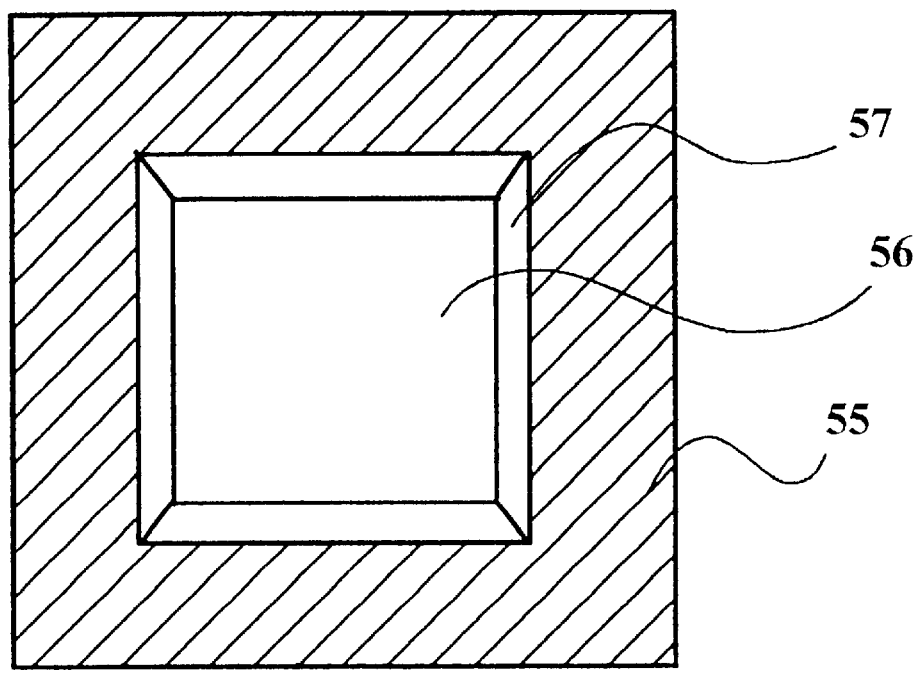

FIG. 6B is a schematic drawing looking from the etching mask 55 side of FIG. 6A. The planar orientation of the SOI substrate is preferably a (100) plane. It is necessary for the material used for the etching mask 55 to be selected as a material that has adequate rate of selectivity with respect to etching of the insulating film 25. In this case, it is possible to use, for example, aluminum or resist as the material of the etching mask 55. The shape of the etching mask 55 can be selected in a rectangular pattern, such as is shown, for example, in FIG. 6B. However, the shape of the etching mask 55 is not limited to that shown in FIG. 6B. The hollow 56 is obtained by etching the etching layer 51 where the etching mask 55 is not formed. The etching method can be dry etching or wet etching. If an SOI substrate with a planar orientation of (100) is etched using wet etching, etching in a direction vertical to the plane orientation is stopped by the etching stop layer 52. Also, in the case where the orientation of each edge of the etching mask 55 is <110>, the planar orientation of a side wall 57 becomes (111) and is hardly etched. Also, in the case where the desired thickness of the hollow 56 is thinner than the thickness of the etching layer 51, there is no problem even if etching is completed before reaching the etching stop layer 52.

Figure 7A:
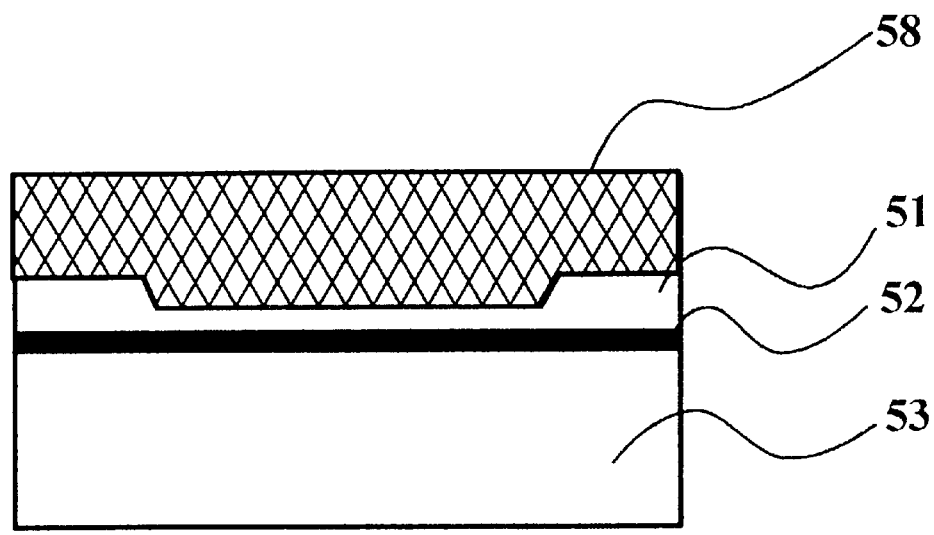
FIG. 7 is a schematic drawing showing a calorimeter relating to embodiment 3 of the present invention, and a manufacturing method thereof.
Figure 7B:
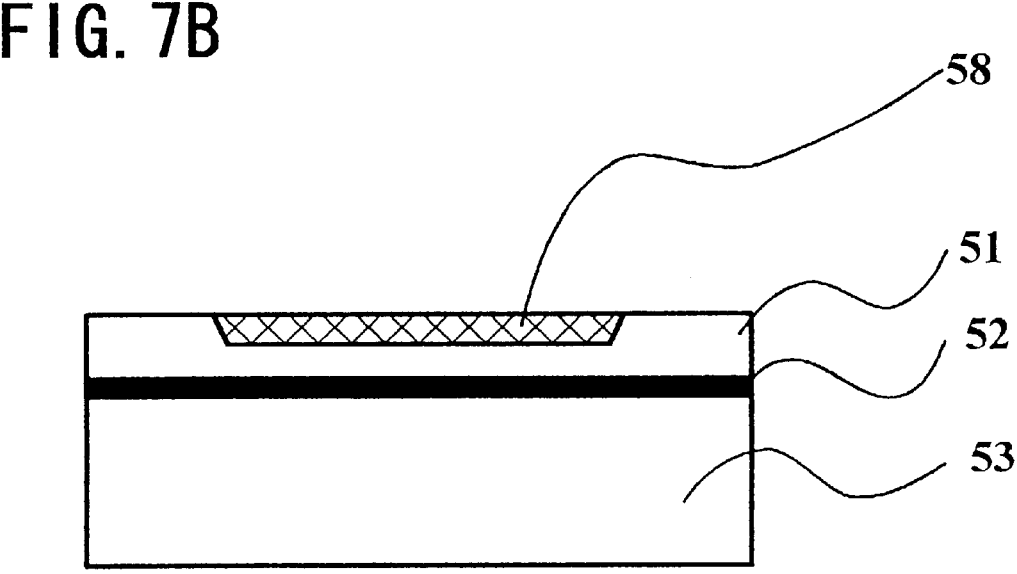

FIG. 7A is a schematic drawing showing a step of depositing a sacrificial layer 58 on the hollow 56, and flattening a surface of the etching layer 51. It is possible to have silicon oxide or silicon, for example, as the material of the sacrificial layer 58. It is also possible to have an organic material as the material of the sacrificial layer 58. It is possible to use sputtering, CVD or evaporation as a method for depositing the silicon oxide or the silicon. Deposition of the sacrificial layer 58 is carried out until the hollow 56 is buried. After the hollow 56 has been buried, it is possible to use, for example, CMP (Chemical Mechanical Polishing) technique as means for flattening the surface of the etching layer 51. CMP involves a chemical reaction utilizing an abrasive, and is capable of performing flattening of the substrate surface to a nanometer order by mechanical etching using friction.

Figure 8A:
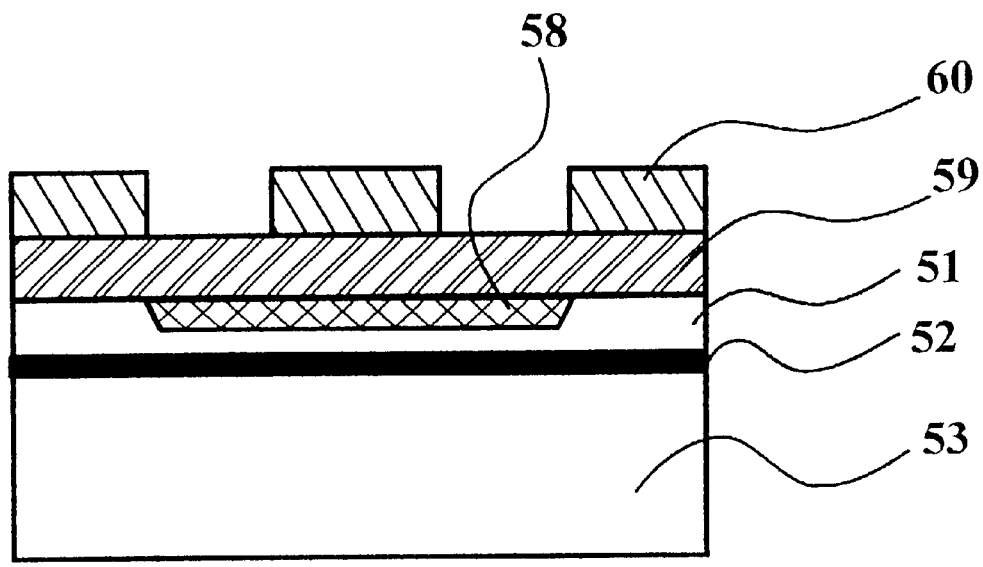
FIG. 8 is a schematic drawing showing a calorimeter relating to embodiment 3 of the present invention, and a manufacturing method thereof.
Figure 8B:
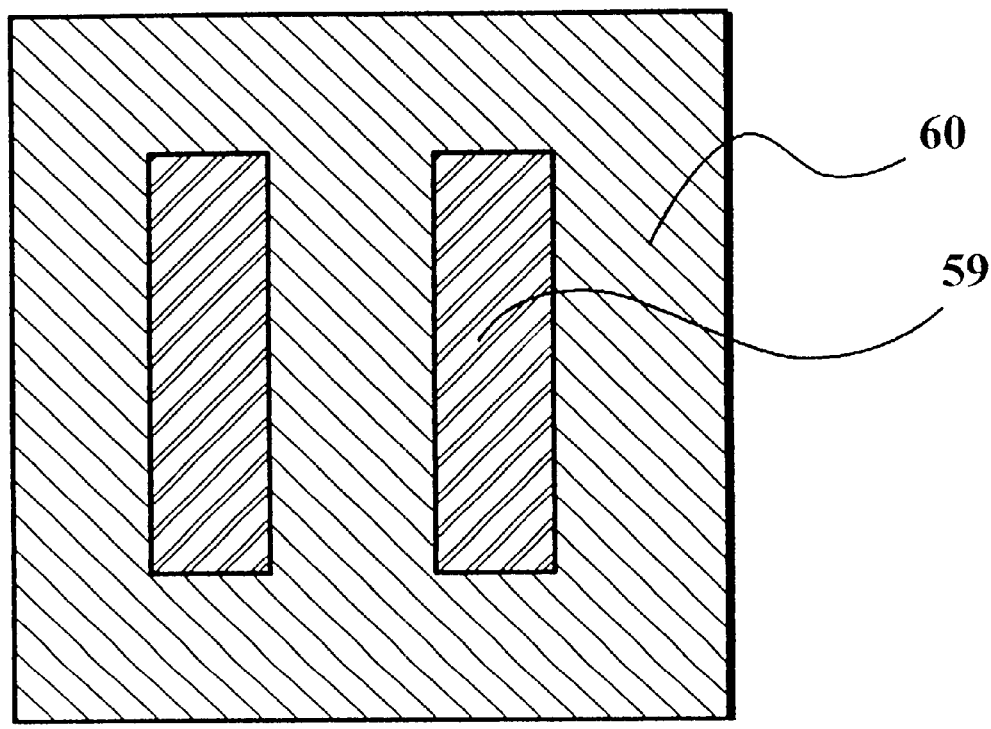

FIG. 8 is a schematic drawing showing formation of an insulating film 59 on an SOI substrate that has been flattened, and formation of an etching mask 60 on the insulating film 59. FIG. 8B is a schematic drawing looking from the side of the insulating film 59 in FIG. 8A. The planar orientation of the SOI substrate is preferably (100). The insulating film 59 formed on the SOI substrate can be, for example, a silicon nitride film. The insulating film 59 is also formed on the etching layer 51 side of the SOI substrate. As film formation means, it is possible to use, for example, LPCVD (Low Pressure Chemical Vapor Deposition), Plasma-CVD or sputtering. However, it is preferable to make the film stress as low as possible. The thickness of the insulating film 59 is dependent on the heat conductance design parameters, but is preferably from 1 $\mu$m–2 $\mu$m. Next, a method for designing the etching mask 60 will be described. It is necessary for the material used for the etching mask 60 to be selected as a material that has adequate rate of selectivity with respect to etching of the insulating film 59. If the insulating film 59 is a silicon nitride film, it is possible for it to be removed by dry etching, such as RIE (Reactive Ion Etching). In this case, it is possible to use, for example, aluminum or resist as the material of the etching mask 60. The shape of the etching mask 60 can be selected in a rectangular pattern, such as is shown, for example, in FIG. 8B. However, the shape of the etching mask 60 is not limited to that shown in FIG. 8B.

Figure 9A:
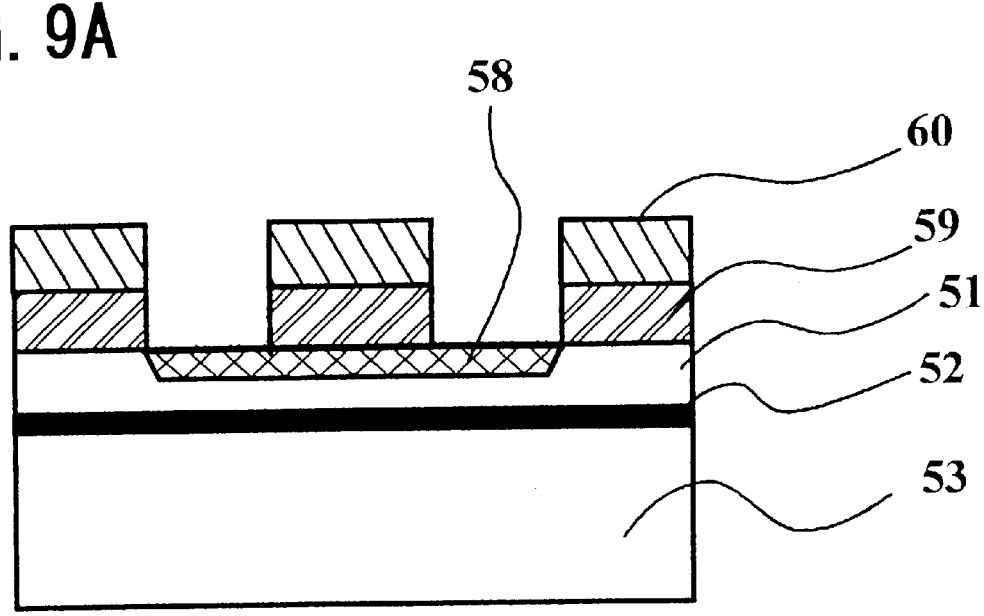
FIG. 9 is a schematic drawing showing a calorimeter relating to embodiment 3 of the present invention, and a manufacturing method thereof.
Figure 9B:
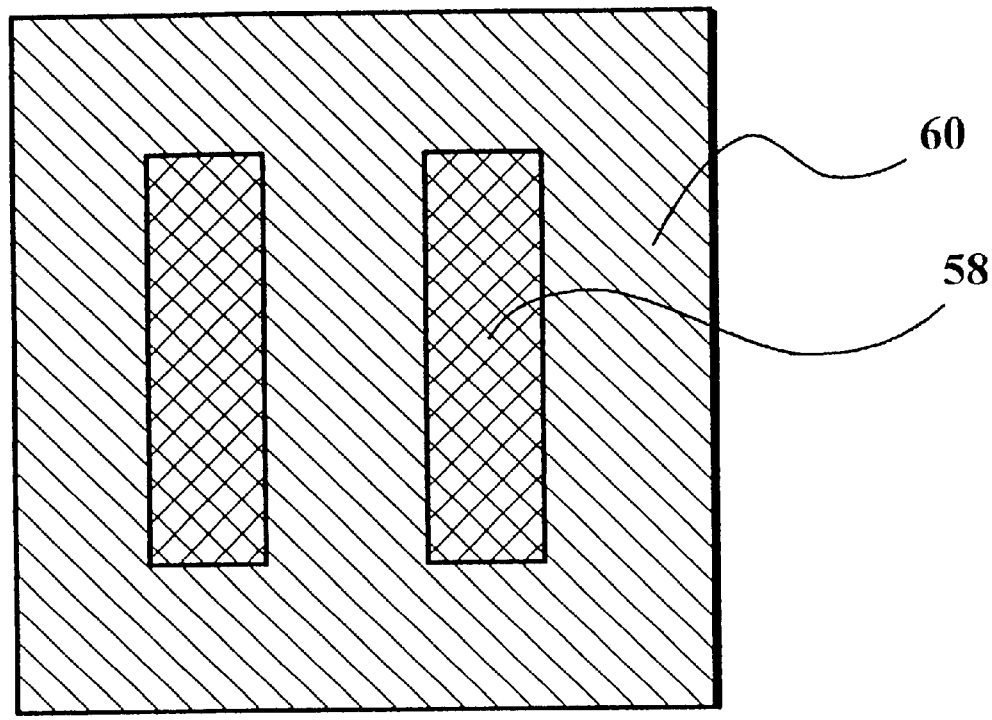

Next, a process for etching the insulating film 59 is shown in FIG. 9. FIG. 9A is a schematic diagram of etching of the insulating film 59 in FIG. 9A, and FIG. 9B is a schematic diagram looking from the direction of the insulating film 59. If the insulating film 59 is a silicon nitride film, it is possible to etch using RIE. It is possible to use, for example, a mixed gas of SF6 and $O_2$ as an etching gas. If, for example, RIE power is a few tens of W, gas flow amount is less than 100 sccm, a ratio of SF6 and $O^2$ flow amount is 5:1, and pressure is a few Pa, it is possible to obtain a selection ratio for the SOI substrate, and it is possible to etch the insulating film 59.

Figure 10A:
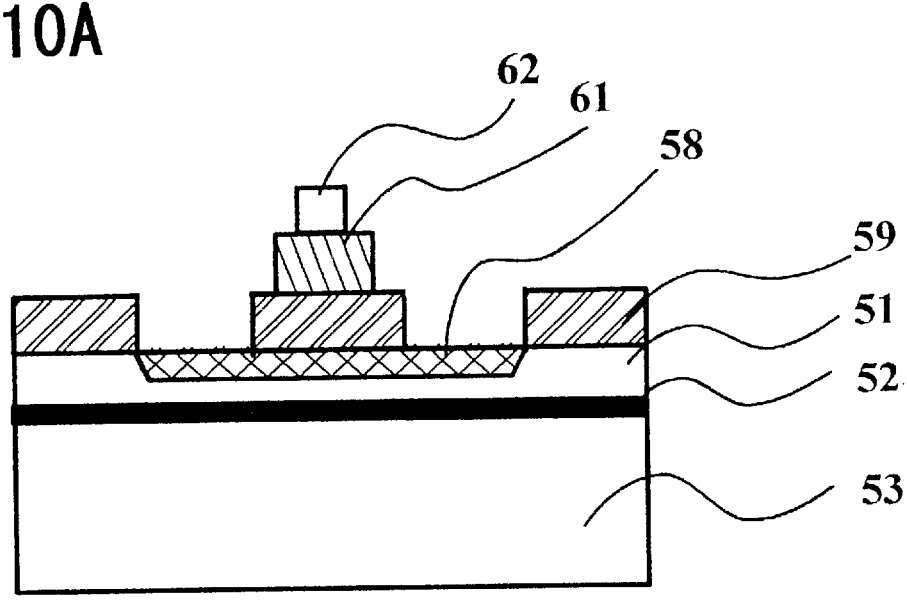
FIG. 10 is a schematic drawing showing a calorimeter relating to embodiment 3 of the present invention, and a manufacturing method thereof.
Figure 10B:
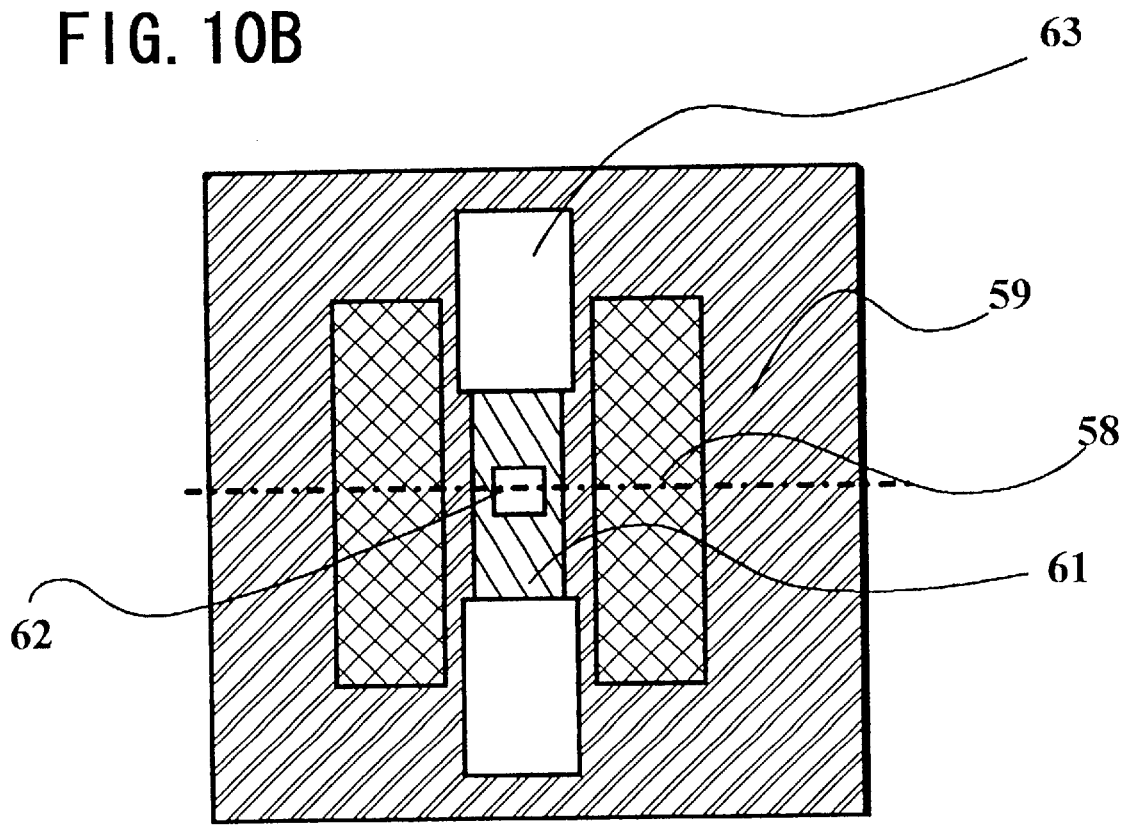

FIG. 10A is a schematic drawing showing a process of stripping the etching mask 60 after the processing of FIG. 9A, and forming a resistor 61 and absorber 62 on the insulating film 59 formed in a bridge shape. FIG. 10B is a schematic drawing looking from the direction of the insulating film 59 in FIG. 10A. FIG. 10A is a cross section along the dotted line in FIG. 10B. A calorimeter comprises an absorber 62 for converting an externally input signal to thermal energy, and a resistor 61 whose resistance value varies with thermal energy, and which converts an externally input signal to an electrical signal. The externally input signal has, for example, radioactive rays or the material with kinetic energy. It is possible to use a bilayer or a single layer superconductor as the resistor. In the case of a bilayer, it is possible to design the superconducting transition temperature by varying the ration of film thicknesses of the normal conductor layer and the superconducting layer. It is also possible for a single layer superconductor to have the functions of both the absorber 62 and the resistor 61.

If the resistor 61 and the absorber 62 are selected as, for example, titanium and gold, they can be made in the following manner. In FIG. 9A, after patterning of a silicon nitride film, being the insulating film 59, has been completed, aluminum, being the etching mask 60, is removed. It is possible for the aluminum to be etched using an alkali solution. Next, titanium, being the resistor 61, is film formed on the insulating film 59 side. The film formation method is sputtering or vacuum evaporation. After formation of the titanium film, a film of gold is formed without breaking the vacuum. Next, patterning of the gold and titanium is performed using mask exposure. It is possible for the gold to be etched using KI (potassium iodide)+I, and to etch the titanium using the hydrogen fluoride solution. After that, superconducting wiring 63 is formed as an electrode. It is possible, for example, to use niobium as the superconducting wiring 63, and for patterning to use a lift-off method.

Figure 11A:
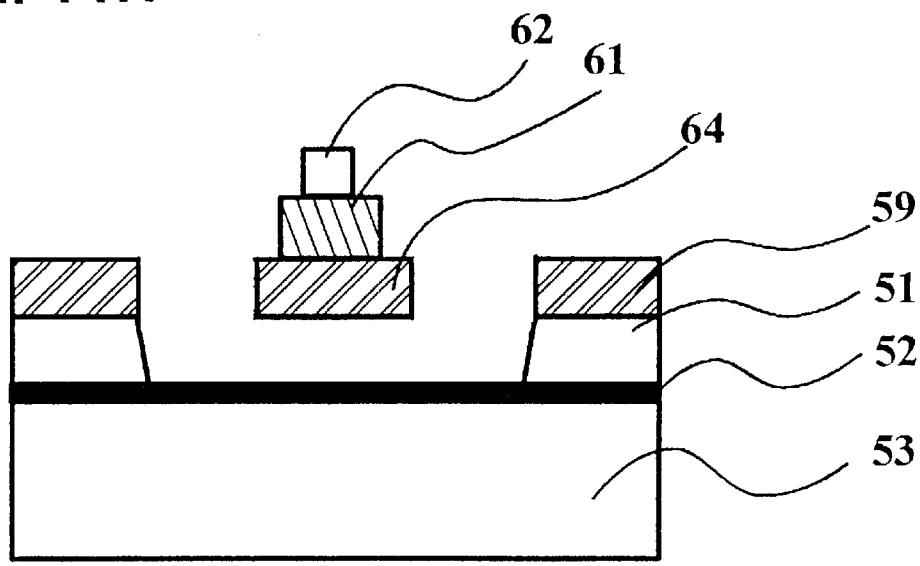
FIG. 11 is a schematic drawing showing a calorimeter relating to embodiment 3 of the present invention, and a manufacturing method thereof.
Figure 11B:
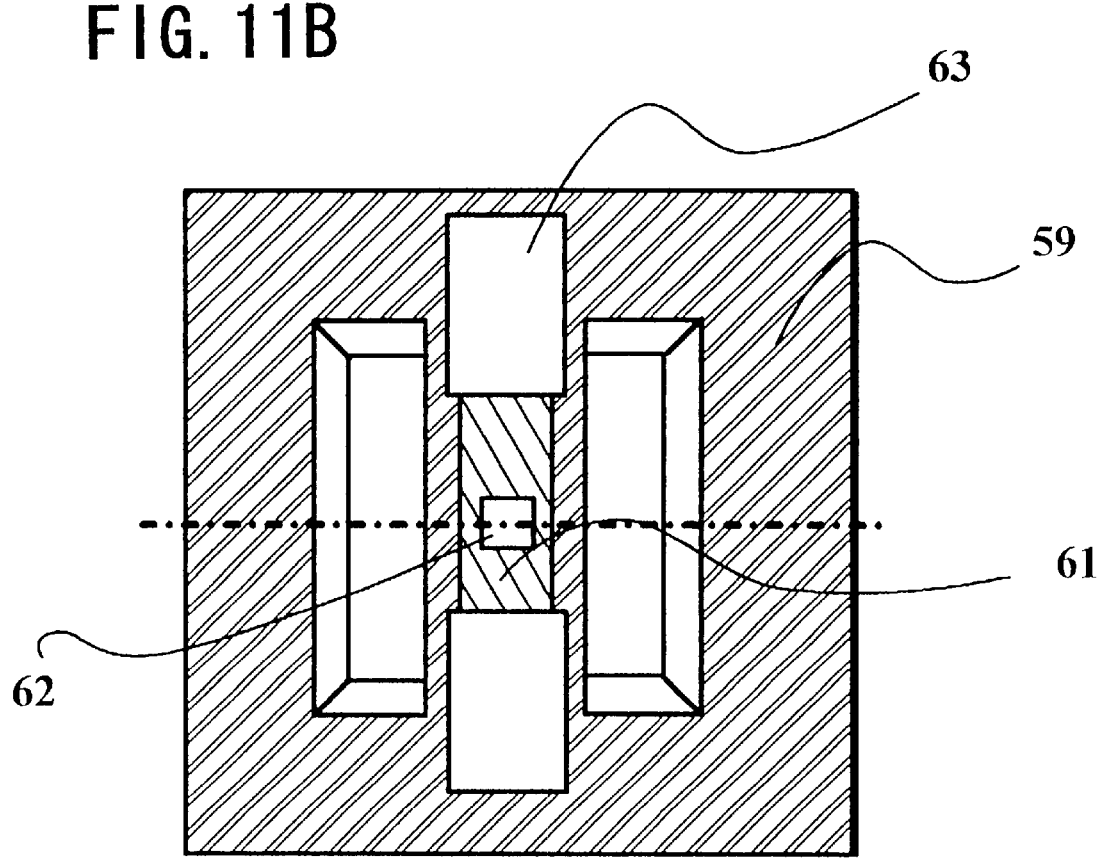

FIG. 11A is a schematic drawing showing a process of etching a sacrificial film 58 embedded in a hollow 56 using wet or dry etching, and forming a membrane 64. FIG. 11B is a schematic drawing looking at the element from the direction of the insulating film 59. FIG. 11A is a cross section taken along the dotted line in FIG. 11B. If the sacrificial layer is, for example, amorphous silicon dioxide, it is possible to use hydrogen fluoride as a wet etching fluid. The temperature of the fluid can be room temperature. Etching of amorphous silicon dioxide is performed using isotropic etching, which means that it does not depend on the arrangement and shape of the membrane 64. In order to obtain thermal insulation between the membrane 64 and the substrate 54, etching is preferably carried out until the amorphous silicon dioxide is completely removed. Also, in order to completely thermally insulate the membrane and the substrate 54, the etching layer 51 is preferably continuously etched until the etching stop layer 52 appears.

As described above, a calorimeter has an absorber for converting energy of radioactive rays into heat, and a resistor for converting heat into an electrical signal using superconducting transition and arranged on a membrane for determining thermal conductivity, the membrane being attached to a substrate having a tri-layer structure of an etching layer, an etching stop layer and a support substrate. By providing a hollow at part of the etching layer, depositing a sacrificial layer, flattening a surface of the etching layer, and etching the etching layer from the etching layer side, and by wet etching the etching layer beneath the membrane regardless of the shape of the membrane, it is possible to easily perform etching, and the membrane can be arranged separated by the thickness of the support substrate and the etching layer. Particularly, if the sacrificial layer is amorphous silicon dioxide, it is possible to simply perform etching using hydrogen fluoride, and it is possible to etch the sacrificial layer in a reduced time. By using a substrate having a tri-layer structure, patterning is only performed on one surface, and there is no danger of the pattern surface being contaminated. Also, since only etching layer of the tri-layer structure substrate is etched, the mechanical strength is improved, and it becomes easier to handle.

In order to achieve these objects, according to the present invention, by using a calorimeter having an absorber for converting energy of radioactive rays into thermal energy, and resistor for converting thermal energy into an electrical signal using superconducting transition and arranged on a membrane for determining thermal conductivity, the membrane being attached to a substrate having a tri-layer structure of an etching layer, an etching stop layer and support substrate, with the membrane being arranged separated by the thickness of the etching stop layer and the etching layer, it is possible to obtain a calorimeter that has large element mechanical strength compared to using the silicon substrate of the related art, and which is suitable for making into an array.

Also, the present invention provides a method of manufacturing a calorimeter having an absorber, for converting energy of radioactive rays into thermal energy, and a resistor for converting thermal energy into an electrical signal using superconducting transition arranged on a membrane for determining thermal conductivity, the membrane being attached to a substrate having a tri-layer structure of an etching layer, an etching stop layer and a support substrate, comprising the steps of arranging the membrane in a specified direction and etching the etching layer from the etching layer side, and wet etching the etching layer beneath the membrane. By this method, it is possible to easily perform etching, and it is possible to arrange the membrane separated by the thickness of the support substrate and the etching layer. In particular, by forming the etching layer from planar (100) oriented silicon, and arranging the orientation of the membrane to <100>, it is made possible to etch the etching layer in a short time. By using a substrate having a tri-layer structure, patterning is only performed on one surface, and there is no danger of the pattern surface being contaminated. Also, since only the etching layer of the tri-layer structure substrate is etched, the mechanical strength is improved, and handling becomes easier.

Also, the present invention provides a method of manufacturing a calorimeter having an absorber for converting energy of radioactive rays into thermal energy, and a resistor for converting thermal energy into an electrical signal using superconducting transition and arranged on a membrane for determining thermal conductivity, the membrane being attached to a substrate having a tri-layer structure of an etching layer, an etching stop layer and a support substrate, comprising the steps of providing a hollow at part of the etching layer, depositing a sacrificial layer, flattening a surface of the etching layer, etching the etching layer from the etching layer side, and wet etching the etching layer beneath the membrane regardless of the shape of the membrane. By this method, it is possible to easily perform etching, and the membrane can be arranged separated by the thickness of the support substrate and the etching layer. Particularly, if the sacrificial layer is amorphous silicon dioxide, it is possible to simply perform etching using hydrogen fluoride, and it is possible to etch the sacrificial layer in a reduced time. By using a substrate having a tri-layer structure, patterning is only performed on one surface, and there is no danger of the pattern surface being contaminated. Also, since only the etching layer of the tri-layer structure substrate is etched, the mechanical strength is improved, and handling is made easier.

What is claimed is:

1. A calorimeter comprising: an absorber for absorbing radiation energy and converting the radiation energy into thermal energy; a resistor connected to the absorber for converting thermal energy into an electrical signal; a membrane connected to the resistor for controlling a thermal discharge from the resistor; and a substrate connected to the membrane and having a tri-layer structure comprised of an etching layer having a preselected thickness, an etching stop layer and a support substrate, the membrane being spaced-apart from an upper main surface of the etching stop layer by the preselected thickness of the etching layer.

2. A method of manufacturing a calorimeter, comprising the steps of: providing a substrate having a tri-layer structure comprised of an etching layer having a preselected thickness, an etching stop layer and a support substrate; disposing an absorber over the substrate for converting radiation energy into thermal energy; connecting a resistor to the absorber for converting thermal energy into an electrical signal; disposing a membrane on the resistor in spaced-apart relation from an upper main surface of the etching stop layer by the preselected thickness of the etching layer and in a given direction for controlling a thermal discharge from the resistor; and etching the etching layer.

3. A method of manufacturing a calorimeter, comprising the steps of: providing a substrate having a tri-layer structure comprised of an etching layer formed from silicon with a planar orientation of (100), an etching stop layer and a support substrate; disposing an absorber over the substrate for converting radiation energy into thermal energy; connecting a resistor to the absorber for converting thermal energy into an electrical signal; disposing a membrane on the resistor in a given direction at an orientation of <100> for controlling a thermal discharge from the resistor; and etching the etching layer.

4. A calorimeter according to claim 1; wherein the resistor comprises a superconductor having a double-layer structure.

5. A calorimeter comprising:
- a substrate having a tri-layer structure comprised of a support substrate, an etching stop layer disposed on the support substrate, and an etching layer disposed on the etching stop layer and having a preselected thickness and a hollow portion;
- an absorber disposed over the substrate for absorbing radiation energy and converting the absorbed radiation energy into thermal energy;
- a resistor connected to the absorber for converting the thermal energy into an electrical signal; and
- a membrane disposed over the hollow portion of the etching layer and spaced-apart from an upper main surface of the etching stop layer by the preselected thickness of the etching layer, the membrane being connected to the resistor for controlling a thermal discharge from the resistor.

6. A calorimeter according to claim 5; wherein the resistor comprises a superconductor having a double-layer structure.

7. A calorimeter comprising: a substrate having a tri-layer structure and comprised of a support substrate, an etching stop layer disposed on the support substrate and having a main surface, and a silicon etching layer having a planar orientation of (100) and disposed on the main surface of the etching stop layer; an absorber disposed over the substrate for absorbing radiation energy and converting the absorbed radiation energy into thermal energy; a resistor connected to the absorber for converting the thermal energy into an electrical signal; and a membrane disposed on the resistor at an orientation of <100> and spaced-apart from the upper main surface of the etching stop layer by a thickness of the etching layer.

8. A calorimeter according to claim 7; wherein the resistor comprises a superconductor having a double-layer structure.

9. A calorimeter according to claim 7; wherein the etching layer has a hollow portion; and wherein the membrane is disposed over the hollow portion of the etching layer.

* * * * *